US012558283B2

(12) United States Patent
Waterman et al.

(10) Patent No.: US 12,558,283 B2
(45) Date of Patent: Feb. 24, 2026

(54) PATIENT-WORN THERAPEUTIC APPARATUS

(71) Applicant: Jacob Waterman, Golden, CO (US)

(72) Inventors: Jacob Waterman, Golden, CO (US); Aaron H. Pierce, Oviedo, FL (US); Daniel R. Hammer, Atlanta, GA (US)

(73) Assignee: Jacob Waterman, Golden, CO (US)

( * ) Notice: Subject to any disclaimer, the term of this patent is extended or adjusted under 35 U.S.C. 154(b) by 1086 days.

(21) Appl. No.: 17/504,166

(22) Filed: Oct. 18, 2021

(65) Prior Publication Data

US 2022/0125661 A1 Apr. 28, 2022

Related U.S. Application Data

(60) Provisional application No. 63/104,167, filed on Oct. 22, 2020.

(51) Int. Cl.
*A61H 1/02* (2006.01)
*A61H 9/00* (2006.01)

(52) U.S. Cl.
CPC ......... *A61H 1/0266* (2013.01); *A61H 9/0078* (2013.01); *A61H 2201/0103* (2013.01); *A61H 2201/1642* (2013.01); *A61H 2201/501* (2013.01); *A61H 2201/5056* (2013.01); *A61H 2201/5071* (2013.01); *A61H 2201/5097* (2013.01); *A61H 2209/00* (2013.01)

(58) Field of Classification Search
CPC ................ A61H 1/0266; A61H 9/0078; A61H 2209/00; A61H 2201/1676; A61H 2201/5056; A61H 2201/5097; A61H 2201/165
See application file for complete search history.

(56) References Cited

U.S. PATENT DOCUMENTS

| | | | | |
|---|---|---|---|---|
| 4,003,374 | A * | 1/1977 | Mizrachy ............... | A61H 15/00 601/126 |
| 5,868,690 | A * | 2/1999 | Eischen, Sr. ......... | A61H 9/0078 128/DIG. 20 |
| 6,010,468 | A * | 1/2000 | Grove .................. | A61H 9/0078 601/23 |
| 2001/0056250 | A1 * | 12/2001 | Manor ................. | A61H 1/0266 601/149 |
| 2004/0171971 | A1 * | 9/2004 | Ravikumar .......... | A61H 1/0266 601/152 |
| 2016/0206500 | A1 * | 7/2016 | Steinlauf .............. | A61H 9/0078 |
| 2016/0361224 | A1 * | 12/2016 | Ramakrishna ....... | A61H 9/0078 |
| 2018/0343971 | A1 * | 12/2018 | Aggarwal .............. | A43B 7/146 |
| 2019/0125619 | A1 * | 5/2019 | Zeutzius .............. | A61H 9/0078 |
| 2020/0246170 | A1 * | 8/2020 | Benenati ................... | A61F 5/01 |

(Continued)

*Primary Examiner* — Tu A Vo
*Assistant Examiner* — Kelsey E Baller
(74) *Attorney, Agent, or Firm* — Fitch, Even, Tabin & Flannery LLP

(57) ABSTRACT

A patient-worn therapeutic apparatus that includes a boot, a plate, and a selectively inflatable bladder. The boot is configured to accommodate a patient's foot and the plate is pivotally disposed within the boot. By one approach the pivot point is disposed proximal to the foot's arch when the patient's foot is accommodated by the boot. The selectively inflatable bladder is disposed on an underside of the plate and is configured to cause the plate to selectively pivot the patient's foot towards the patient when the patient's foot is accommodated by the boot.

19 Claims, 3 Drawing Sheets

(56) References Cited

U.S. PATENT DOCUMENTS

| | | | | |
|---|---|---|---|---|
| 2020/0337931 | A1* | 10/2020 | Shuch | A61H 1/0266 |
| 2021/0069050 | A1* | 3/2021 | Welsh | A61H 9/0078 |
| 2022/0047446 | A1* | 2/2022 | Suarez | A61H 9/0071 |
| 2022/0125666 | A1* | 4/2022 | Gilbert | A61H 9/0092 |
| 2022/0151812 | A1* | 5/2022 | Gunnsteinsson | A61F 5/0195 |
| 2022/0241137 | A1* | 8/2022 | Solana | A61H 9/005 |

* cited by examiner

PATIENT-WORN THERAPEUTIC APPARATUS

RELATED APPLICATION(S)

This application claims the benefit of U.S. Provisional application No. 63/104,167, filed Oct. 22, 2020, which is incorporated by reference in its entirety herein.

TECHNICAL FIELD

These teachings relate generally to therapeutic apparatuses and more particularly to apparatuses that assist with stretching.

BACKGROUND

Stretching exercises are a known effective approach to treating plantar fasciitis, achilles tendinitis, and other conditions of the human foot. Stretching also increases blood flow which can help prevent Deep Vein Thrombosis (DVT). That said, it can be difficult for a person requiring such therapy to properly, safely, and timely execute the required stretching.

BRIEF DESCRIPTION OF THE DRAWINGS

The above needs are at least partially met through provision of the patient-worn therapeutic apparatus described in the following detailed description, particularly when studied in conjunction with the drawings, wherein.

Figure 1:
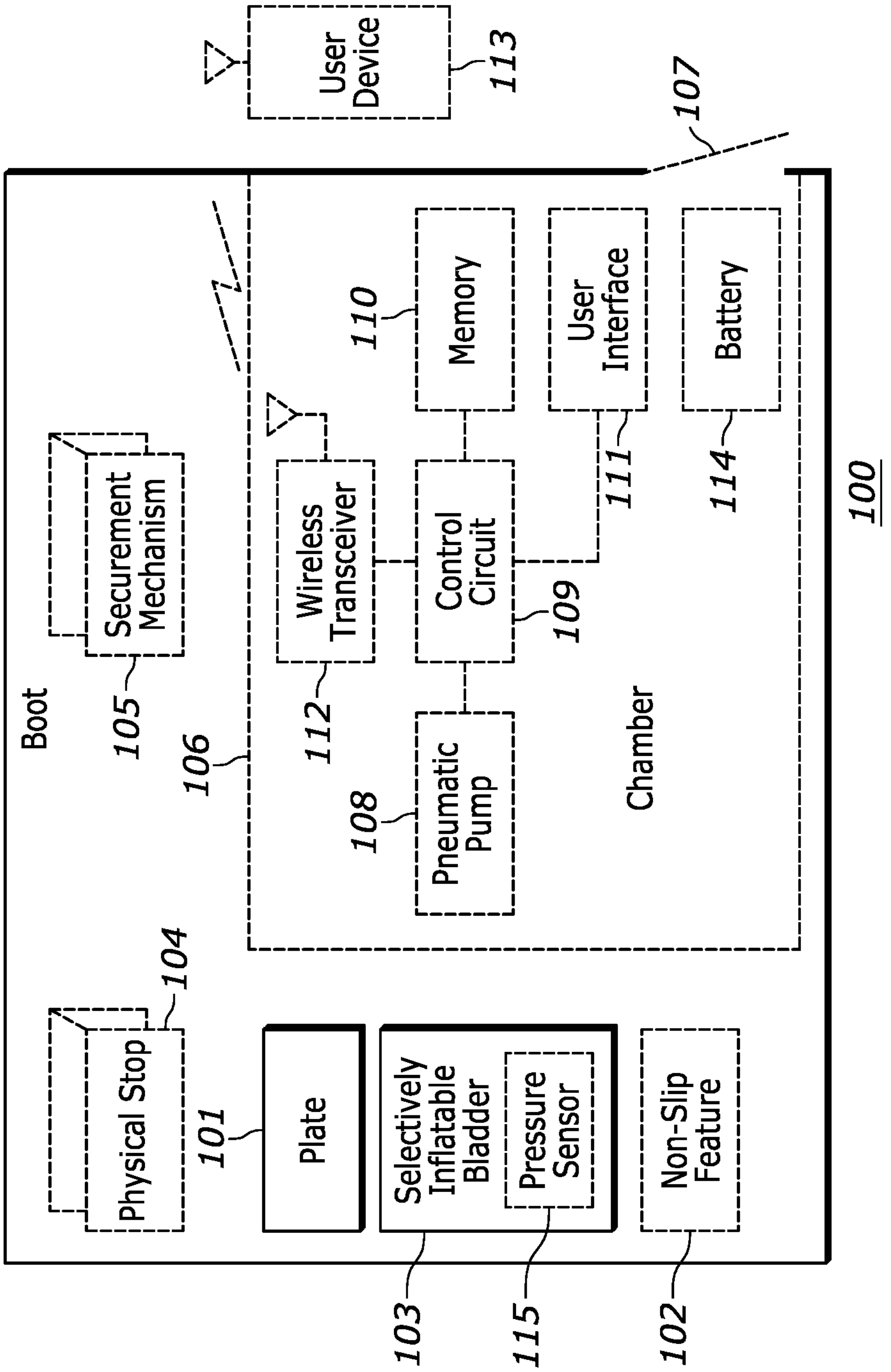
FIG. 1 comprises a block diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated.

DETAILED DESCRIPTION

Generally speaking, these various embodiments pertain to a patient-worn therapeutic apparatus that includes a boot, a plate, and a selectively inflatable bladder. The boot is configured to accommodate a patient's foot and the plate is pivotally disposed within the boot. By one approach the pivot point is disposed proximal to the foot's arch when the patient's foot is accommodated by the boot. The selectively inflatable bladder is disposed on an underside of the plate and is configured to cause the plate to selectively pivot the patient's foot towards the patient when the patient's foot is accommodated by the boot.

By one approach the boot is at least substantially comprised of plastic. By one approach, the foregoing further includes at least one securement mechanism configured to secure the boot to the patient when the patient's foot is accommodated by the boot. If desired, the boot can further include, on a bottom exterior surface thereof, a non-slip feature.

By one approach the aforementioned plate comprises a substantially flat plate configured to contact the patient's foot. These teachings will accommodate other form factors for the plate, however, including a plate that is not flat and which instead has a patient-facing surface that at least substantially conforms to the shape of the patient's foot. By one approach, the boot is further configured such that the patient's foot's heel contacts a non-moving part of the boot.

By one approach the aforementioned selectively inflatable bladder comprises a wedge-shaped bladder when inflated. If desired, the apparatus may further include a pneumatic pump disposed within the boot and configured to selectively inflate the inflatable bladder.

By one approach, the apparatus further includes a control circuit configured to control inflation and deflation of the selectively inflatable bladder. If desired, the control circuit may operably couple to a user interface disposed on the boot such that a user can control operation of the pump via that user interface. In lieu of the foregoing or in combination therewith, the apparatus may include a wireless transceiver disposed within the boot that operably couples to the control circuit such that the control circuit can communicate via the wireless transceiver with, for example, an external user device such as a smart phone, a pad/tablet-styled computer, and/or a laptop computer.

By one approach the apparatus can further include a battery disposed within the boot that is operably coupled to power one or more of the foregoing components, such as the pump and the control circuit. Such a battery may comprise, for example, a rechargeable battery as desired.

The boot includes a chamber formed therein. This chamber may receive one or more of the foregoing components, such as the pump, control circuit, and battery. If desired, the boot can also include an access door that provides selective user access to, for example, the battery.

By one approach, the apparatus can be configured to prevent the plate from pivoting further than a predetermined distance from an initial unpivoted orientation (where the predetermined distance may be an angle within the range of 40° to 50°). By one approach, a physical stop can be configured to physically block the plate from moving beyond that permitted range. By another approach, in lieu of the foregoing or in combination therewith, a pressure sensor can be operably coupled to the control circuit and configured to detect a pressure corresponding to use of the apparatus by the patient.

So configured, a user can easily place their foot within the boot and secure the boot in place. The user can then initiate the controlled inflation (and deflation) of the bladder to thereby control the orientation of the plate and hence the pivoting of the foot which serves to effect the desired stretching of the foot.

These and other benefits may become clearer upon making a thorough review and study of the following detailed description. Referring to the drawings, and in particular to FIG. 1, an illustrative apparatus that is compatible with many of these teachings will now be presented.

Figure 2:
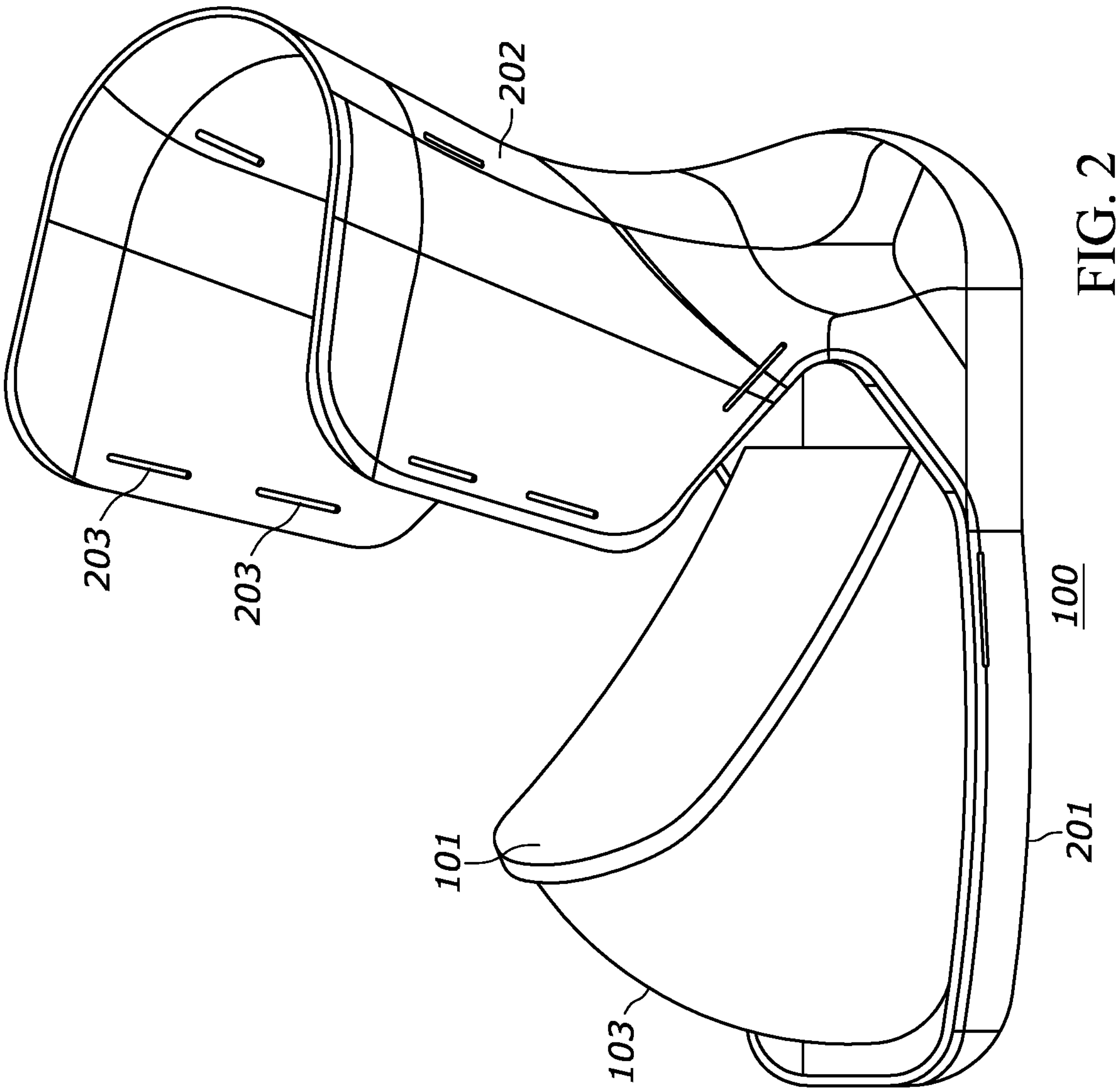
FIG. 2 comprises a perspective view as configured in accordance with various embodiments of these teachings.

In this illustrative example, the apparatus comprises a boot 100. This boot 100 can be comprised of one or more appropriate materials including both man-made (including synthetic) materials (such as any of a variety of plastics) and/or natural materials such as leather or cloth. Referring momentarily to FIG. 2, by one approach this boot 100 includes a bottom portion 201 and an upper portion 202. In this example the boot 100 has a relatively open configuration that leaves the user's foot largely exposed rather than enclosed. The upper portion 202 of the boot 100 is configured to at least partially encompass the user's ankle and leg (not shown) to facilitate securing the boot 100 in place during use.

This boot 100 is configured to accommodate a patient's foot. It will be understood that a foot generally comprises a heel, arch, and ball. The bottom portion 201 of the boot 100 in particular serves to receive and contact at least the heel and ball of the patient's foot as described below in more detail.

By one optional approach, if desired, the boot 100 may include one or more non-slip features 102. For example, the exterior under surface of the boot 100 may include a tread pattern or other gripping features and/or materials that serve to increase friction with the surface upon which the boot 100 rests.

By one optional approach, in lieu of the foregoing or in combination therewith, the boot 100 may include one or more securement mechanisms 105. Each securement mechanism 105 can be configured to secure the boot to the patient when the patient's foot is accommodated by the boot 100. By one approach, and referring to FIG. 2, the upper portion 202 of the boot 100 may include slots (two of which are denoted by reference 203) to receive corresponding straps, laces, or the like to facilitate such securement. These teachings will accommodate any of a variety of securement approaches including, but not limited to, snaps, buttons, buckles, hooks-and-loops fasteners, zippers, and so forth.

With continued reference to both FIGS. 1 and 2, the patient-worn therapeutic apparatus further includes a plate 101. This plate 101 is pivotally disposed within the boot 100. More particularly, that pivot point is disposed proximal to the foot's arch when the patient's foot is accommodated by the boot 100. These teachings will accommodate various locations in these regards. For example, the pivot point may be disposed central to the arch, or within the arch but near the heel, or within the arch but near the ball.

By one approach, and as depicted in FIG. 2, the plate 101 may comprise a substantially flat plate configured to contact the patient's foot (and in particular the ball of the patient's foot but not the heel of the patient's foot). This plate 101 may be comprised of one or more of a variety of materials including both synthetic and natural materials. Though the plate 101 may include some padding or the like, generally speaking the plate 101 comprises a firm substrate.

Being flat, the plate 101 will not contact the arch of the foot in a typical application setting. If desired, the plate 101 may have a foot-facing surface that includes curves to conform and match to part or all of the under surface of the foot. So configured, it will be understood that the heel of the foot does not contact the plate 101 and instead contacts a non-moving part of the boot 100 when the patient's foot is accommodated by the boot 100.

Figure 3:
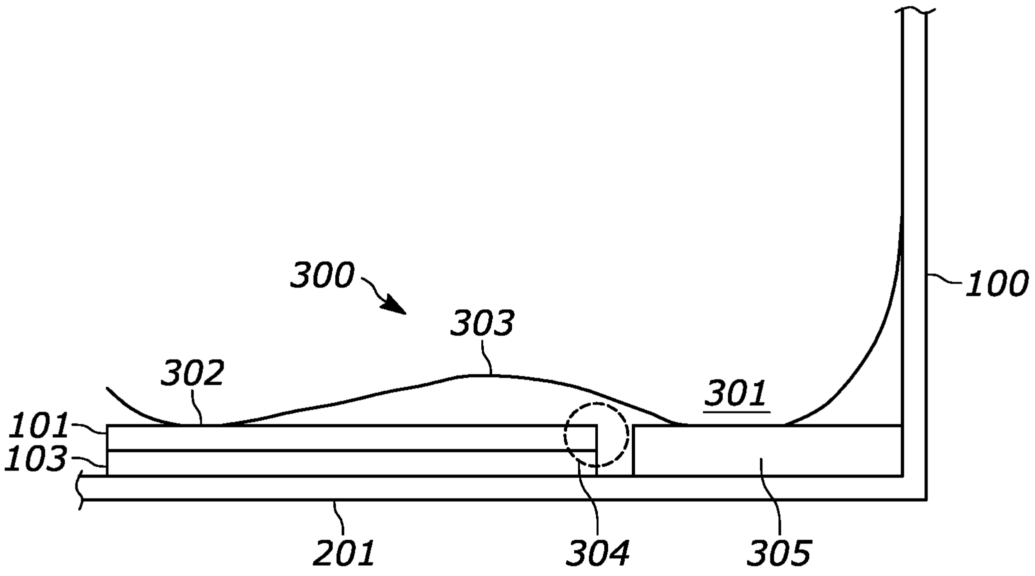
FIG. 3 comprises a side elevational schematic view as configured in accordance with various embodiments of these teachings.

FIG. 3 presents an example in the foregoing regards. In this example, a nonmoving part 305 of the boot 100 contacts the heel 301 of the foot 300. The ball 302 of the foot 300 contacts the plate 101. And the pivot point (denoted by the phantom-line circle bearing reference numeral 304) is disposed within the arch 303 of the foot 300. FIG. 3 depicts the plate 101 in a non-pivoted state and orientation.

Figure 4:
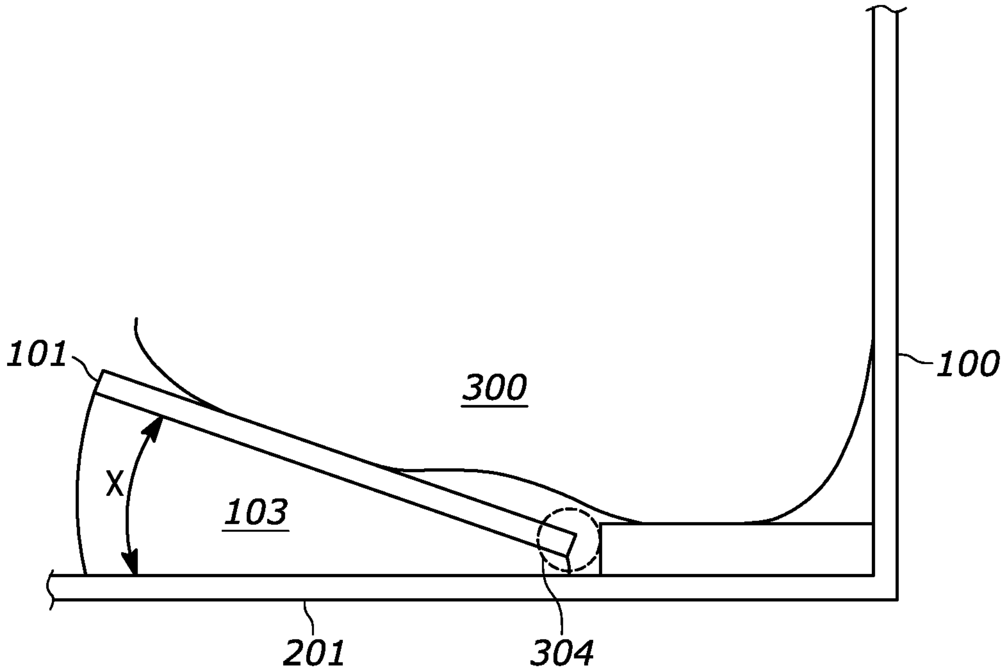
FIG. 4 comprises a side elevational pneumatic as configured in accordance with various embodiments of these teachings.

Referring again to FIGS. 1 and 2, the patient-worn therapeutic apparatus also includes a selectively inflatable bladder 103. This selectively inflatable bladder 103 is disposed on the underside of the plate 101 and is configured to cause the plate 101 to selectively pivot the patient's foot 300 towards the patient (i.e., towards the patient's shin) when the patient's foot 300 is accommodated by the boot 100. FIG. 4 depicts the selectively inflatable bladder 103 in a partially inflated state. By one approach this bladder 103 comprises a wedge-shaped bladder when inflated.

The extent to which the plate 101 pivot's away from the boot 100 depends upon the extent to which the selectively inflatable bladder 103 is inflated. That said, the boot 100 can optionally include a physical stop 104 that is configured to physically block the plate 101 from pivoting further than a predetermined distance from an initial unpivoted orientation. For example, that predetermined distance can correspond to a pivot angle X within a range of 40° to 50°, such as 45°. These teachings will also accommodate configuring the selectively inflatable bladder 103 itself to not expand any further than the desired maximum pivot angle X.

The selectively inflatable bladder 103 can be comprised of any suitable airtight material including a variety of plastics, rubber, and so forth.

Referring to FIG. 1, by one approach the boot 100 has one or more chambers 106 formed therein. This chamber 106 might be formed within, for example, the non-moving portion 305 that is disposed beneath the heel 301 of the foot 300. If desired an access door 107 can be provided in the side of the boot 100 to provide selective user access to all or part of the chamber 106 and its contents. This access door 107 can be secured in a closed orientation using any of a variety of known approaches in these regards.

By one approach, a pneumatic pump 108 can be disposed within the boot 100 (for example, within the aforementioned chamber 106). This pneumatic pump 108 can be configured to inflate the selectively inflatable bladder 103. Depending upon the configuration, the pneumatic pump 108 may also serve, at least in part, to selectively deflate the selectively inflatable bladder 103. As one example in these regards, the mini pump having part number JQB2438274 as offered by TCS Electrical can serve in these regards.

By one approach, a control circuit 109 can be included within the boot (for example, within the aforementioned chamber 106). Being a "circuit," the control circuit 109 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 109 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 109 is configured (for example, by using corresponding programming as will be well understood by those skilled in the art) to carry out one or more of the steps, actions, and/or functions described herein.

By one optional approach the control circuit 109 operably couples to a memory 110. This memory 110 may be integral to the control circuit 109 or can be physically discrete (in whole or in part) from the control circuit 109 as desired. This memory 110 can also be local with respect to the control circuit 109 (where, for example, both share a common circuit board, chassis, power supply, and/or housing) or can be partially or wholly remote with respect to the control circuit 109 (where, for example, the memory 110 is physically located in another facility, metropolitan area, or even country as compared to the control circuit 109).

This memory 110 can serve, for example, to non-transitorily store the computer instructions that, when executed by the control circuit 109, cause the control circuit 109 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as a dynamic random access memory (DRAM).)

In this illustrative example, the control circuit 109 is configured to control inflation and deflation of the selectively inflatable bladder 103. Further description in these regards appears below.

By one optional approach, a user interface 111 is disposed on the boot 100 (for example, at least partially on or contiguous with an external surface of the boot 100) that operably couples to the aforementioned control circuit 109. This user interface 111 may comprise, for example, one or more buttons or switches, a small touch-sensitive display, one or more discrete signal lights, a microphone, a speaker, and so forth. By one approach the control circuit 109 is configured to respond to the user interface to thereby allow a user to control, at least partially, operation of the aforementioned pneumatic pump 108 and hence the inflation state of the selectively inflatable bladder 103. As one example, asserting a button on the user interface 111 may cause the control circuit 109 to initiate a particular inflation/deflation sequence.

By another optional approach, in lieu of the foregoing or in combination therewith, these teachings will accommodate further including a wireless transceiver 112 in the boot 100 that operably couples to the control circuit 109. So configured, and as one example, the control circuit 109 can be configured to communicate via the wireless transceiver 112 with an external user device 113. For example, these teachings will accommodate communicating with a smart phone, a pad/tablet-styled computer, a laptop computer, and so forth. The latter may be configured with a computer program/app to facilitate programming and operating the selectively inflatable bladder 103 if desired.

By one approach, the aforementioned chamber 106 may also accommodate a battery 114 that is operably coupled to power the pneumatic pump 108, the control circuit 109, the user interface 111, the wireless transceiver 112, and so forth. By one approach, this battery 114 comprises a rechargeable battery, in which case the boot 100 can also include a port to facilitate connecting the battery 114 to a charging source.

By one approach, if desired, these teachings will accommodate providing a pressure sensor 115 on the interior of the selectively inflatable bladder 103 and/or elsewhere such that the pressure sensor 115 can detect a pressure that corresponds to use of the apparatus by the patient. The detected pressure may correspond directly to inflation pressure of the selectively inflatable bladder 103, or may reflect instead, for example, a force being exerted by the foot 300 on the plate 101. This pressure sensor 115 can operably couple to the control circuit 109. In this case, the control circuit 109 can be additionally configured to stop the plate 101 from pivoting in a given direction as a function, at least in part, of the detected pressure.

The boot 100 can of course be configured and provided in a variety of different sizes to accommodate differently-sized feet. If desired, removable inserts can be provided in the boot 100 to accommodate feet that are smaller than a given target size. These teachings will also accommodate configuring the boot 100 to be adjustable in any of a variety of ways to facilitate accommodating a range of differently-sized feet.

With a patient's foot 300 secured in the boot 100, the patient's foot can be selectively pivoted towards the patient's leg via inflation of the selectively inflatable bladder 103. Notwithstanding this pivotal movement, the patient's heel remains in contact with a non-moving part of the boot 100. The extent of the pivoting, and the duration of the pivoting, can be controlled by the aforementioned control circuit 109 as desired.

As one simple example in these regards, one preprogrammed exercise could provide for inflating the selectively inflatable bladder 103 to pivot the patient's foot 20° and to maintain that orientation for a set period of time, such as 10 minutes. The selectively inflatable bladder 103 could then be automatically deflated and maintained in a deflated state for a set period of time, such as five minutes. The selectively inflatable bladder 103 could then be automatically inflated to pivot the patient's foot 30° and to maintain that orientation for a set period of time, such as 10 minutes. After another deflation cycle of, say, five minutes, the selectively inflatable bladder 103 could then be inflated to pivot the patient's foot 40° and to maintain that orientation for yet another set period of time, such as 10 minutes.

These teachings will accommodate using this apparatus for specific treatment sessions, such as a 15 minute or 30 minute session. These teachings will also accommodate, however, using this apparatus for longer periods of time, such as while the patient sleeps at night.

So configured, these teachings will facilitate effective yet safe stretching of a patient's foot in a manner that requires little or no training and/or attention being paid by the user.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A patient-worn therapeutic apparatus comprising:

a boot configured to accommodate a patient's foot, the patient's foot comprising a heel, arch, and ball;

a plate pivotally disposed within the boot and having a corresponding pivot point located at a rear end of the plate and configured to be disposed proximal to the foot's arch when the patient's foot is accommodated by the boot;

a non-moving heel support disposed within the boot and adjacent the plate such that the foot's heel contacts the non-moving heel support when the patient's foot is accommodated by the boot;

a selectively inflatable bladder disposed on an underside of the plate and configured to cause the plate to selectively pivot the patient's foot towards the patient when the patient's foot is accommodated by the boot;

a gap disposed between the rear end of the plate and a front end of the non-moving heel support and the gap further separating the front end of the non-moving heel support and a rear end of the selectively inflatable bladder; and whereby when the patient's foot is accommodated by the boot, the foot's ball contacts a front end of the plate opposite the rear end of the plate, the rear end of the plate and the gap are both disposed proximal to the foot's arch, and a bottom of the foot's heel contacts an uppermost surface of the non-moving heel support.

2. The patient-worn therapeutic apparatus of claim 1 wherein the boot is at least substantially comprised of plastic.

3. The patient-worn therapeutic apparatus of claim 1 further comprising:

at least one securement mechanism configured to secure the boot to the patient when the patient's foot is accommodated by the boot.

4. The patient-worn therapeutic apparatus of claim 1 wherein the plate comprises a substantially flat plate configured to contact the patient's foot.

5. The patient-worn therapeutic apparatus of claim 1 wherein the selectively inflatable bladder comprises a wedge-shaped bladder when inflated.

6. The patient-worn therapeutic apparatus of claim 1 further comprising:

a pneumatic pump disposed within the boot and configured to inflate the selectively inflatable bladder.

7. The patient-worn therapeutic apparatus of claim 6 wherein the boot further includes a chamber formed therein and wherein the pneumatic pump is disposed within the chamber.

8. The patient-worn therapeutic apparatus of claim 7 wherein the apparatus further includes:

a control circuit configured to control inflation and deflation of the selectively inflatable bladder; and wherein the control circuit is disposed within the chamber.

9. The patient-worn therapeutic apparatus of claim 8 wherein the apparatus further includes:

a battery disposed within the boot and operably coupled to power the pump.

10. The patient-worn therapeutic apparatus of claim 9 wherein the battery comprises a rechargeable battery.

11. The patient-worn therapeutic apparatus of claim 9 wherein the boot further includes an access door that provides selective user access to the battery.

12. The patient-worn therapeutic apparatus of claim 8 further comprising:

a user interface disposed on the boot and operably coupled to the control circuit such that a user can control operation of the pump via the user interface.

13. The patient-worn therapeutic apparatus of claim 8 further comprising:

a wireless transceiver disposed within the boot and operably coupled to the control circuit.

14. The patient-worn therapeutic apparatus of claim 13 wherein the control circuit is further configured to communicate via the wireless transceiver with an external user device.

15. The patient-worn therapeutic apparatus of claim 14 wherein the external user device comprises at least one of:

a smartphone;

a pad/tablet-styled computer;

a laptop computer.

16. The patient-worn therapeutic apparatus of claim 8 further comprising:

a pressure sensor that is operably coupled to the control circuit and that is configured to detect a pressure corresponding to use of the apparatus by a patient: and wherein the control circuit is configured to stop the plate from pivoting in a given direction as a function, at least in part, of the detected pressure.

17. The patient-worn therapeutic apparatus of claim 1 further comprising:

a physical stop configured to physically block the plate from pivoting further than a predetermined distance from an initial unpivoted orientation.

18. The patient-worn therapeutic apparatus of claim 17 wherein the predetermined distance is within a range of 40 degree to 50 degrees.

19. The patient-worn therapeutic apparatus of claim 1 wherein the boot further includes, on a bottom exterior surface thereof, a non-slip feature.

* * * * *